(12) United States Patent
Nalin et al.

(10) Patent No.: US 10,574,013 B2
(45) Date of Patent: Feb. 25, 2020

(54) BRUSH CAGE FOR MOTOR VEHICLE STARTER, AND CORRESPONDING BRUSH HOLDER, ELECTRIC MOTOR AND MOTOR VEHICLE STARTER

(71) Applicant: VALEO EQUIPEMENTS ELECTRIQUES MOTEUR, Creteil (FR)

(72) Inventors: Marie-Ange Nalin, Chazey sur Ain (FR); Maximilien Gentil, Corbas (FR); Alain Bost, L'isle D'abeau (FR); Wilfried Pays, Sermerieu (FR); Pierre Mollon, Estrablin (FR)

(73) Assignee: Valeo Equipements Electriques Moteur, Creteil (FR)

( * ) Notice: Subject to any disclaimer, the term of this patent is extended or adjusted under 35 U.S.C. 154(b) by 358 days.

(21) Appl. No.: 15/533,876

(22) PCT Filed: Dec. 10, 2015

(86) PCT No.: PCT/FR2015/053424
§ 371 (c)(1),
(2) Date: Jun. 7, 2017

(87) PCT Pub. No.: WO2016/092222
PCT Pub. Date: Jun. 16, 2016

(65) Prior Publication Data
US 2017/0310066 A1 Oct. 26, 2017

(30) Foreign Application Priority Data
Dec. 12, 2014 (FR) ..................... 14 62294

(51) Int. Cl.
*H01R 39/40* (2006.01)
*H01R 39/415* (2006.01)
*H02K 5/14* (2006.01)

(52) U.S. Cl.
CPC ........... *H01R 39/415* (2013.01); *H02K 5/148* (2013.01); *H01R 2201/26* (2013.01)

(58) Field of Classification Search
CPC ... H01R 39/415; H01R 2201/26; H02K 5/148
(Continued)

(56) References Cited

U.S. PATENT DOCUMENTS 4,868,441 A * 9/1989 Bulick .................. H01R 39/40
310/239
6,144,134 A * 11/2000 Lin ....................... H01R 39/383
310/238

(Continued)

FOREIGN PATENT DOCUMENTS

DE 3644128 A1 7/1988
WO WO0250981 A1 6/2002
WO WO2014049289 A1 4/2014

*Primary Examiner* — Jianchun Qin
(74) *Attorney, Agent, or Firm* — Berenato & White, LLC

(57) ABSTRACT

The invention relates mainly to a brush cage (13) for a brush holder (10) of an electric motor comprising:—two lateral walls (26) and a connecting wall (28) connecting the two lateral walls (26),—in which cage at least one of the lateral walls (26) has an opening (43) for the passage of a spring arm,—the lateral wall (26) comprising the opening (43) having a length (L0) measured between a first end (51) intended to be furthest from a commutator and a second end (52) intended to be closest to the commutator, wherein the opening (43) comprises at least a first portion (431) between the two ends (51, 52) which widens out towards the second end (52).

14 Claims, 5 Drawing Sheets

(58) Field of Classification Search
USPC .......................................................... 310/247
See application file for complete search history.

(56) References Cited

U.S. PATENT DOCUMENTS

| | | |
|---|---|---|
| 6,864,615 B2 | 3/2005 | Vacheron et al. |
| 7,141,907 B2 * | 11/2006 | Yang .................... H01R 39/381 |
| | | 310/239 |
| 7,239,062 B2 | 7/2007 | Vacheron et al. |
| 9,923,429 B2 * | 3/2018 | Osborne ................ H02K 13/10 |

* cited by examiner

BRUSH CAGE FOR MOTOR VEHICLE STARTER, AND CORRESPONDING BRUSH HOLDER, ELECTRIC MOTOR AND MOTOR VEHICLE STARTER

CROSS-REFERENCE TO RELATED APPLICATIONS AND CLAIM PRIORITY

This application is a national stage application of International Application No. PCT/FR2015/053424 filed Dec. 10, 2015, which claims priority to French Patent Application No. 1462294 filed Dec. 12, 2014, the disclosures of which are incorporated herein by reference and to which priority is claimed.

FIELD OF THE INVENTION

The invention relates to a brush cage for a motor vehicle starter as well as to the corresponding brush holder, electric motor and starter. The invention finds particularly advantageous, but not exclusive application, for motor vehicle starters, in particular those installed in vehicles equipped with the function of automatically stopping and restarting the heat engine (known in English as "stop and start" function).

BACKGROUND OF THE INVENTION

In the commonly known way, a brush holder is mounted on the shaft of the rotor of a starter so as to make the brushes cooperate with an electric commutator integral with the shaft of the rotor. The brush holder comprises a baseplate supporting a set of cages, each serving as housing for a brush. The brushes consisting of electrically conductive material allow power to be supplied to the rotor by commutation of the electric current in the conductors of the rotor.

For this purpose, each brush comprises a face intended to rub against the conductive segments of the commutator connected to the winding of the rotor. An elastic means, such as a spring, exerts a force on each brush held in a cage in the direction of the commutator to ensure contact between the brush and the commutator segments.

The brushes have alternate polarities. Thus, the brushes of positive polarity are electrically connected, via their respective braid, to an inter-brush connector to which the feeder wire leading from the contactor of the starter is also electrically connected. In addition, the brushes intended to return current are electrically connected to the mass of the machine by means of their respective braid welded onto the baseplate.

As visible on FIG. 1, in certain configurations of brush holders, it is known to use a helical spring 1 comprising a coiled part 2 mounted on a leg 3 as well as an arm 4 extending from an end of coiled part 2 intended to rest against an end face of brush 5 opposite the face in contact with the commutator segments. To enable spring 1 to apply a force on brush 5, arm 4 passes via an opening 6 arranged in a lateral wall 7 of brush cage 8.

Due to the torque applied by spring 1 to leg 3 as well as vibrations experienced by the system, spring 1 tends to position itself transversely relative to leg 3 and rub against one of the parallel edges of opening 6 (high edge (see arrow F) or low edge depending on the operating conditions), which can cause a blockage in the displacement of arm 4 of spring 1.

SUMMARY OF THE INVENTION

The invention aims at effectively overcoming this disadvantage by proposing a brush cage for electric motor brush holders comprising:

two lateral walls and a connecting wall connecting the two lateral walls,
in which at least one of the lateral walls has an opening for the passage of a spring arm,
said lateral wall comprising said opening having a length measured between a first end intended to be furthest from a commutator and a second end intended to be closest to said commutator,
characterized in that said opening comprises at least a first portion between the two ends which widens out towards the second end.

Thus, because of the widened shape of the opening arranged in the lateral wall of the brush cage, the spring has more freedom during its travel. Thus a blockage in the displacement of the spring is avoided when the latter positions itself transversely relative to its support.

According to an embodiment, said first portion of said opening comprises two edges arranged in said lateral wall and in that one of both edges is inclined relative to said connecting wall to form the widening.

According to an embodiment, the second edge moreover is inclined in the opposite direction relative to the direction of inclination of the first edge.

According to an embodiment, said opening comprises a second portion extending between said first end and said first portion, said second portion widening out towards said first end. This permits insertion and centring of the arm of the helical spring to be facilitated.

According to an embodiment, said opening comprises a third portion extending between said second end and said first portion, said third portion widening out towards said first end. This permits insertion of the braid of the brush into the opening of the wall in the zone located near the commutator to be facilitated.

According to an embodiment, said opening comprises a fourth portion extending between said second end and said third portion, said fourth portion being delineated by parallel edges of said lateral wall separating two low walls of said lateral wall, said brush cage moreover comprising a fin connecting said two low walls together.

According to an embodiment, said fin comprises two parts extending in two different planes inclined relative to one another. Thus the rigidity of the brush cage is increased.

According to an embodiment, said first portion of said opening comprises three edges arranged in said lateral wall, one edge of which connecting an inclined edge to a second edge.

According to an embodiment, the brush cage comprises a first and second lateral wall, each lateral wall having an opening,
said first lateral wall having an opening with more than four portions such as previously defined, and
said second lateral wall having an opening with more than two portions such as previously defined.

The invention is also aimed at an electric motor brush holder equipped with brush cages such as previously defined.

The invention moreover relates to an electric motor comprising a brush holder such as previously defined.

The invention equally relates to a motor vehicle starter comprising an electric motor such as previously defined.

BRIEF DESCRIPTION OF THE DRAWINGS

The invention will be better understood on reading the following description and examining the accompanying figures. These figures are only given on a purely illustrative basis which is by no means restrictive of the invention.

Identical, similar or analogous components keep the same reference symbol from one figure to the next.

DETAILED DESCRIPTION OF THE PREFERRED EMBODIMENT(S)

Figure 1:
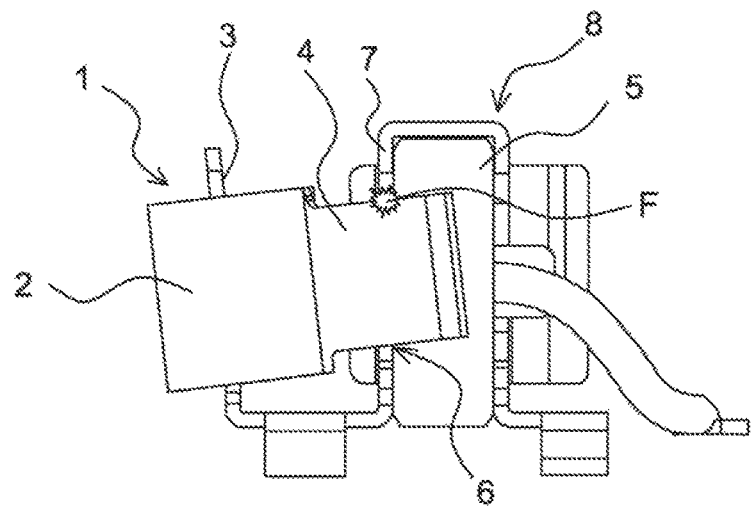
FIG. 1, already described, is a rear view of a brush cage and the associated helical spring illustrating the frictional problems posed by the prior art devices.
Figure 2:
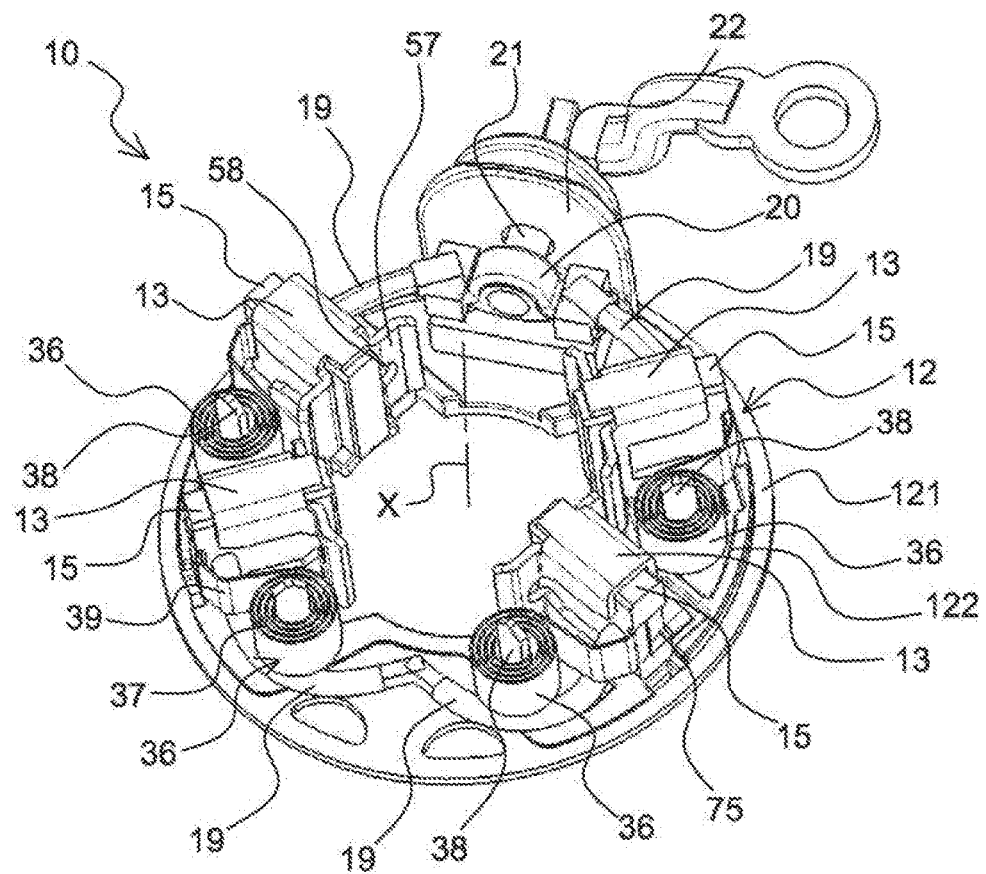
FIG. 2 is a perspective view of an electric motor brush holder according to the present invention.

FIG. 2 shows a brush holder 10 according to the invention intended to be used with a motor vehicle starter. This brush holder 10 comprises a baseplate 12 of substantially annular shape on which is fixed a set of cages 13 each serving as housing for a brush 15. An axis X of baseplate 12 corresponds to an axis of brush holder 10.

Figure 3:
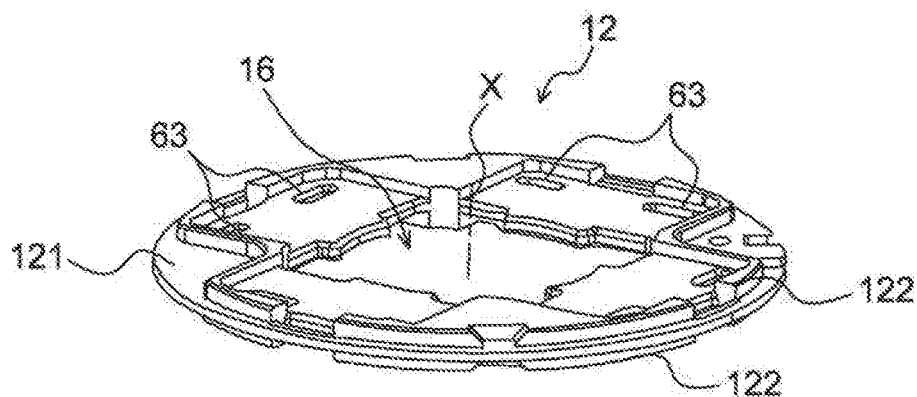
FIG. 3 is a perspective view of the baseplate for the brush holder in FIG. 2.

Baseplate 12, clearly visible on FIG. 3, is a one-piece part comprising a metal plate 121 and over-moulded layers 122 covering both sides of metal plate 121. Over-moulded layers 122 are implemented by means of a plastic ensuring good electric insulation. Over-moulded layers 122 cover all endangered zones of baseplate 12, that is to say, all the zones where a short-circuit might occur. Over-moulded layers 122 are sensitive to heat and can deform above a predetermined temperature so that a short-circuit can be induced in the event of overheating. Typically the plastic used for over-moulded layers 122 is a thermoplastic material such as Polyamide PA4.6 or PA6.6 or fibre-reinforced Polypropylene PPS.

Baseplate 12 and cages 13 which it supports are fastened on a cover (not illustrated) forming a rear bearing for the rotor shaft of the electric machine. Moreover the central part of baseplate 12 comprises an opening 16 through which the sub-assembly it forms with brush cages 13 and brushes 15 is mounted around the shaft of the rotor of the starter.

Each brush 15 is mounted so as to slide inside a cage 13 which is open on the side of axis X to allow brushes 15 to make electrical contact with segments borne by a commutator of a rotor of the electric machine (not illustrated).

Brushes 15 have alternate polarities. Thus, brushes 15 of positive polarity are electrically connected, via their respective braid 19, to a brush interconnector 20 to which the feeder wire leading from the contactor of the starter is also electrically connected. In fact, brush interconnector 20 is connected to the feeder wire via a pin 21 passing through a grommet 22 cooperating with the carcass of the starter to ensure the sealing of brush holder 10.

Positive brushes 15 and their corresponding cages 13 are electrically insulated from the negative polarity for good performance of the starter. This insulation is obtained by over-moulded layers 122. Flexible braids 19 are advantageously made of copper or copper alloy to facilitate welding on plate 121. Braids 19 could also act as a fuse. In addition, brushes 15 of negative polarity intended to return current are electrically connected to the mass of the machine by means of their respective braid 19 welded onto plate 121 of baseplate 12.

Figure 4A:
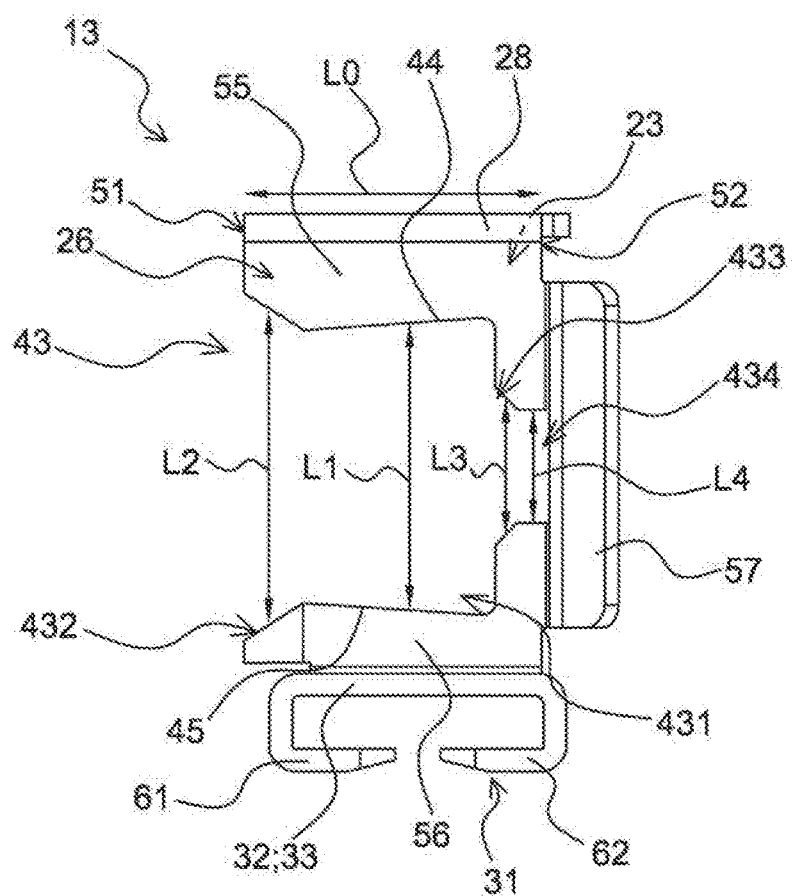
FIGS. 4a to 4c correspond to a lateral view and two perspective views respectively according to two different visual angles illustrating a first embodiment of a brush cage according to the present invention.
Figure 4B:
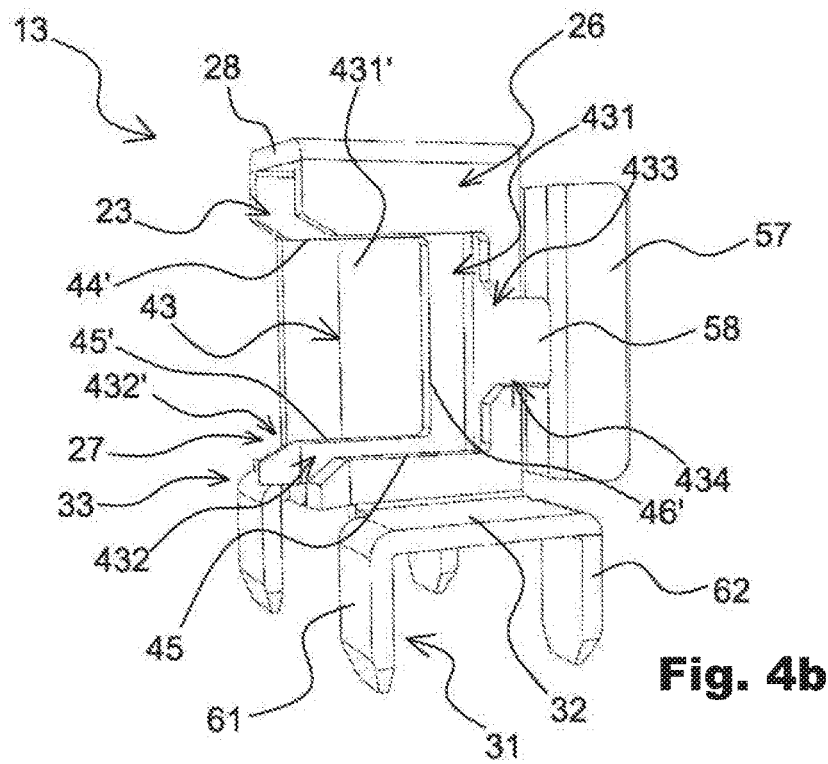
Figure 4C:
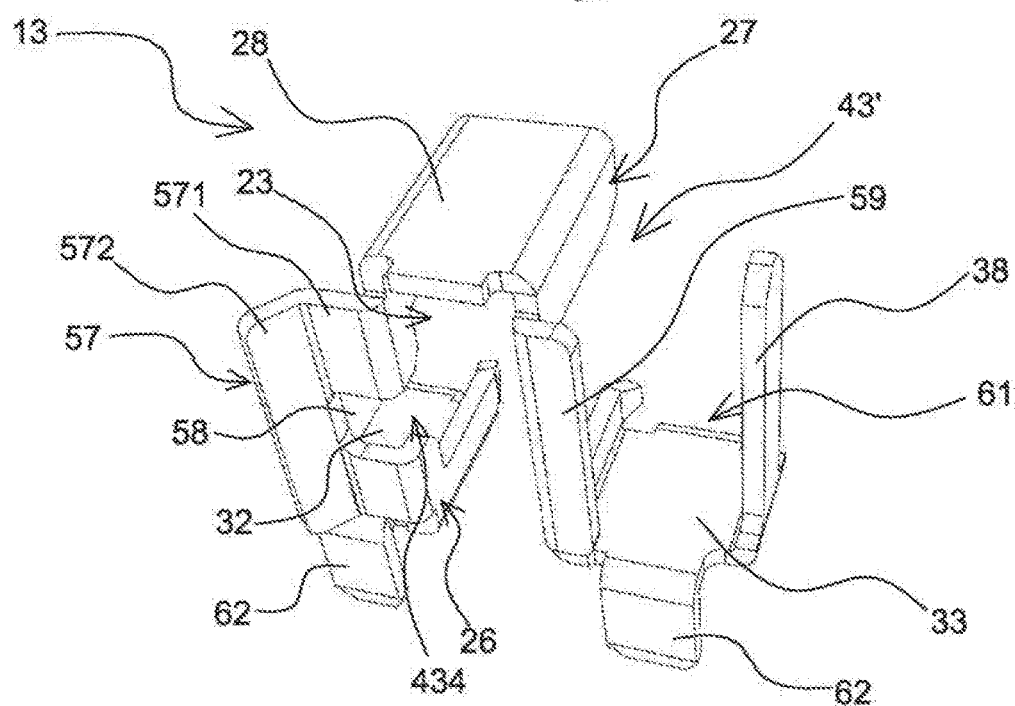

More precisely, as quite visible on FIGS. 4a to 4c, each brush cage 13 has a housing 23 for brush 15 delineated by two lateral walls 26, 27 parallel in relation to each other connected together by a higher connecting wall 28. Each cage 13 is fixed on baseplate 12 by means of a fastening device 31, described in more detail, below pertaining to end walls 32, 33 leading from the lower edges of lateral walls 26, 27.

In addition, a helical spring 36 associated with each cage 13 radially attracts the corresponding brush 15 towards segments of the commutator. For this purpose each spring 36 comprises a coiled part 37 mounted around a leg 38 axially extending relative to axis X as well as an arm 39 intended to be supported against a face of brush 15 opposite the face in contact with the commutator segments. Leg 38, which extends outside housing 23 of brush 15, is in fact obtained by folding one of end walls 32, 33 of each cage 13.

As clearly visible on FIG. 4a, lateral wall 26 has an opening 43 for the passage of arm 39 of spring 36. This lateral wall 26 has a length L0, measured along a direction perpendicular to the axis X, between a first end 51 furthest from the commutator and a second end 52 closest to the commutator (located on the side opposite arm 39 of the spring).

The opening 43 comprises at least a first portion 431 between two ends 51, 52 which widens out towards the second end 52, that is to say the L1 width of the first portion 431 measured along the axis X increases when moved towards the second end 52. The first portion (431, 431') is axially spaced from the second end (52) along the axis X, as best shown in FIG. 4a. This first portion 431 of the opening 43 comprises two opposite edges 44, 45 arranged in the lateral wall 26. One of the edges 44 is inclined relative to the connecting wall 28 and second edge 45 is also inclined in the opposite direction relative to the direction of inclination of the first edge 44 to form the widening. Alternatively, only one of the two edges 44, 45 is inclined to form the widening.

Opening 43 moreover comprises a second portion 432 extending between first end 51 and first portion 431. This second portion 432 widens out towards first end 51, that is to say the L2 width of this second portion 432 measured along axis X increases when moved towards first end 51. This second portion 432 permits insertion and centring of arm 39 of spring 36 to be facilitated.

Opening 43 comprises a third portion 433 extending between second end 52 and first portion 431. This third portion 433 widens out towards first end 51, that is to say the L3 width of this third portion 433 measured along axis X increases when moved towards first end 51. This third portion 433 permits insertion of braid 19 of brush 15 to be facilitated during its displacement towards the commutator due to the wear of brush 15.

Opening 43 comprises a fourth portion 434 extending between second end 52 and third portion 433. This fourth portion 434 is delineated by parallel edges of wall 26. In other words, this fourth portion 434 has a L4 width measured along axis X which is substantially constant. The edges of this portion 434 separate two low walls 55, 56 forming wall 26. These two overall L-shaped low walls 55, 56 are connected together by a fin 57.

In order to increase the rigidity of cage 13, fin 57 comprises two parts 571, 572 extending in two inclined planes different from one another, as clearly visible on FIG. 4c. It should be noted that fourth portion 434 of opening 43 can be extended in a notch 58 arranged in fin 57 to allow the passage of braid 19 of brush 15 located in the corresponding cage 13 closest to the commutator.

As visible on FIG. 4b, the other lateral wall 27 has an opening 43' comprising a first portion 431' and a second portion 432' having a configuration similar to first portion 431 and second portion 432 respectively of opening 43. In this case, inclined edges 44' and 45' arranged in wall 27 are connected together by an edge 46' having an orientation parallel with axis X. In other words lateral wall 27 is formed by two low walls which are connected together on the side of the commutator by a band of material extending in the plane of wall 27. Alternatively, only one of two edges 44' and 45' is inclined. On the side of the face of brush 15 emerging on the side of the commutator, a fin 59 leads from an edge of wall 27 to mechanically stiffen cage 13.

As illustrated on FIG. 2, braid 19 of brush 15 and arm 39 of corresponding spring 36 could be positioned on a same side of cage 13, for the brushes of negative polarity braid 19 of which is welded onto plate 121. Braid 19 and arm 39 are in fact positioned on the side of wall 26 which comprises open portions 431, 432 allowing the passage of arm 39 of spring 36 as well as open portions 433, 434 allowing the passage of braid 19.

In addition, for brushes 15 of positive polarity having their braid 19 welded onto interconnector 20, arm 39 of spring 36 and braid 19 are positioned on both sides of brush 15 respectively. In this case, spring 36 is positioned on the side of wall 27, so that its arm 39 passes through portions 431', 432' of opening 43'; while braid 19 is positioned on the side of wall 26 in order that at the end of travel of spring 36 it can pass through open portions 433, 434 as well as through notch 58 of fin 57 so that braid 19 can move as close as possible to the commutator to maximize the potential use of brush 15.

Figure 5:
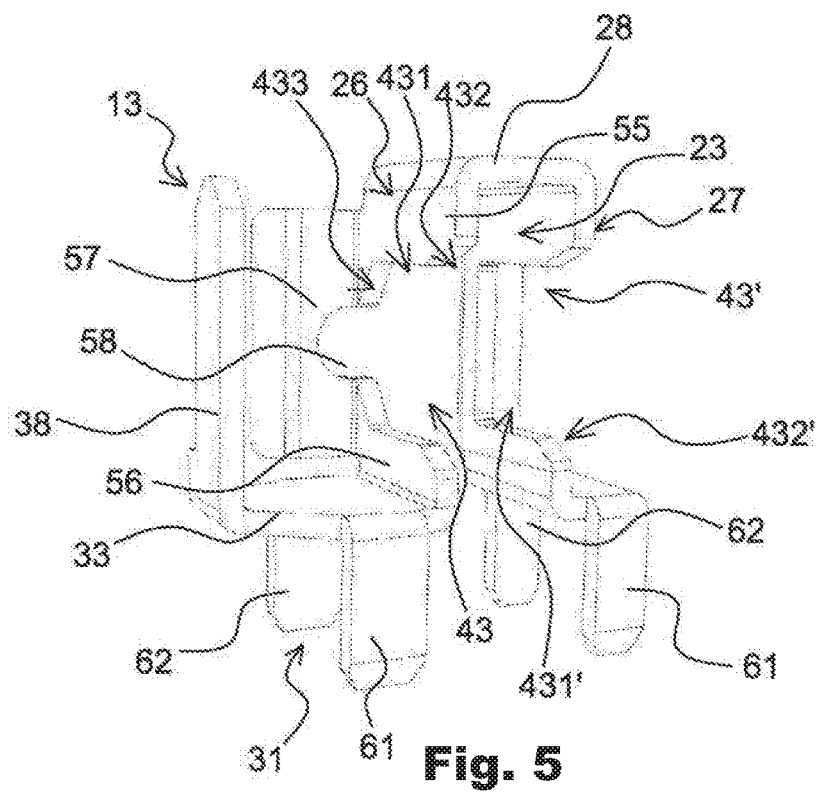
FIG. 5 is a perspective view illustrating a second embodiment of a brush cage according to the present invention.

Alternatively, as illustrated on FIG. 5, opening 43 of wall 26 is devoid of fourth portion 434, third portion 433 being extended directly in notch 58 implemented in fin 57. In this case, opening 43 separates two L-shaped low walls 55, 56 connected together by fin 59. Lateral wall 27, provided with its opening 43' and the two corresponding portions 431' and 432', is similar to that of the embodiment on FIGS. 4a to 4c.

Figure 6:
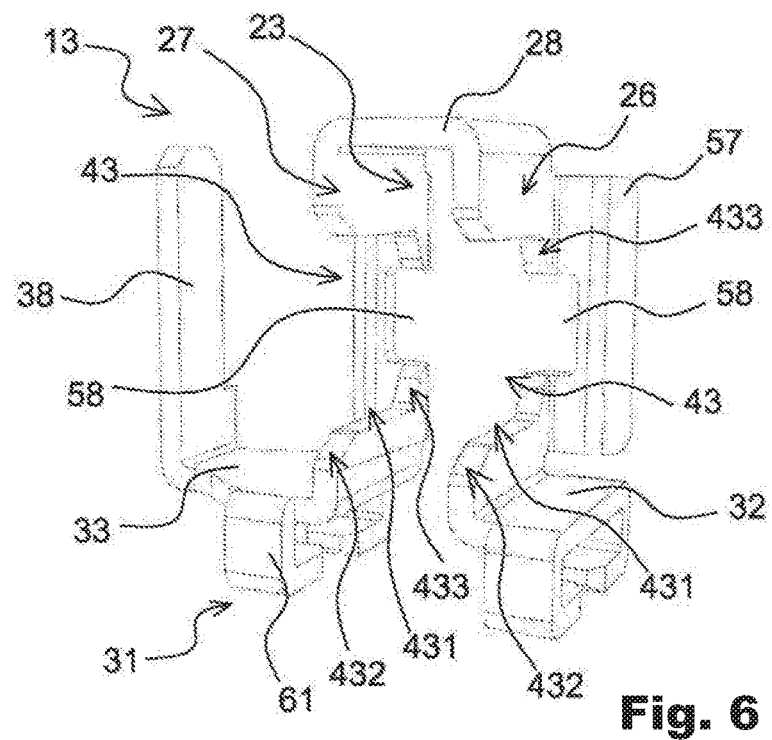
FIG. 6 is a perspective view illustrating a third embodiment of a brush cage according to the present invention.

Alternatively, as illustrated on FIG. 6, two walls 26, 27 are symmetrical and have identical openings 43 with a first portion 431, a second portion 432, and a third portion 433 being extended in a notch 58 implemented in the corresponding fin 57, 59, like the embodiment on FIG. 5.

In addition, the system for fastening to baseplate 12 is formed by two pairs of legs 61, 62. Legs 61, 62 of each pair lead from two edges opposite end walls 32, 33. A leg 61 of each pair is intended to pass through baseplate 12 via a hole 63 which is implemented depending on its thickness (see FIG. 3). The other leg 62 of each pair is supported against a side of the interior contour delineating opening 16. As shown on FIGS. 4a and 6, legs 61, 62 of each pair are intended to be folded towards each other against baseplate 12.

Alternatively, the fastening system 31 comprises at least one rivet passing through baseplate 12 and an end wall 32, 33 of brush cage 13. In an exemplary embodiment each cage 13 could be obtained by folding a thin metal panel so as to substantially form an omega, the end branches of which are fixed on baseplate 12.

Preferably, holes 63 receiving legs 61, 62 of cages 13 of negative polarity as well as the zones of baseplate 12 in contact with cages 13 receiving brushes 15 of negative polarity are not electrically insulated, so that electrical contact can be made between cages 13 of negative polarity and plate 121 via legs 61, 62. This contact is not injurious to operation of the starter, provided it participates in making electrical contact between the parts designed to have the same electrical potential, in fact the mass potential of this application.

Figure 7A:
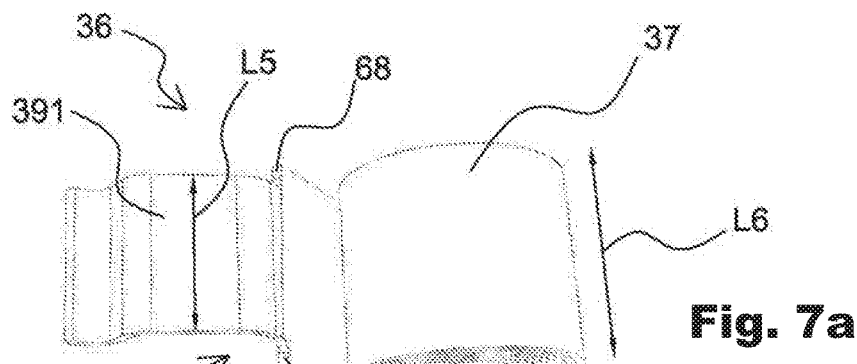
FIGS. 7a to 7c are perspective views illustrating the three different embodiments of a helical spring according to the present invention.
Figure 7B:
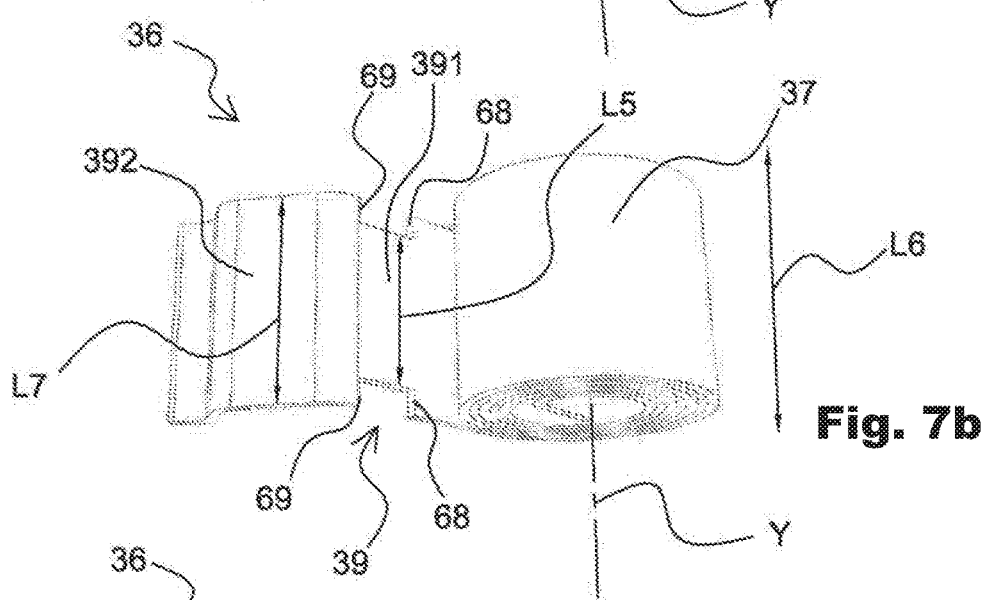
Figure 7C:
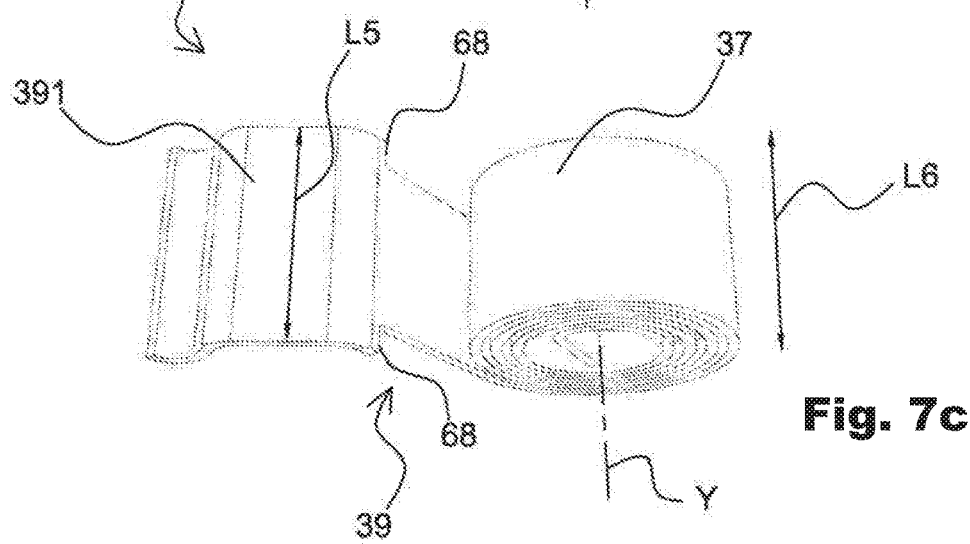

As clearly visible on FIGS. 7a to 7c, coiled part 37 of spring 36 is formed by a plurality of helical coils 371 around an axis Y. Arm 39 extends from an end of coiled part 37 mounted around leg 38. Arm 39 is intended to be supported against the rear face of brush 15 opposite the face of brush 15 resting against the commutator segments.

In the embodiment of FIG. 7a, arm 39 comprises a portion 391, the L5 width of which measured along axis Y is less than the L6 width of the coiled part 37 measured along axis Y. This portion 391 is delineated by two recesses 68 resulting from the part of arm 39 having a width identical to the L6 width of coiled part 37 and extending towards the interior of the band of material of arm 39.

This portion 391 of arm 39 having reduced width is at minimum equal to the length of the portion of arm 39 passing through opening 43 of lateral wall 26 between the beginning of travel of spring 36 and the end of travel of spring 36. It is specified here that the beginning of travel of spring 36 corresponds to the position of arm 39 of spring 36 for a brush 15 at the beginning of its life having a maximum length, while the end of travel of spring 36 corresponds to a position of arm 39 of spring 36 for a brush 15 at the end of its life having a minimum length. In fact, portion 391 extends as far as the end of arm 39 located in cage 13 which is supported against brush 15.

In the embodiment of FIG. 7b, portion 391 having reduced width is substantially equal to the length of the portion of arm 39 passing through opening 43 of lateral wall 26 between the beginning and end of travel of spring 36. In this case, arm 39 can comprise a second portion 392 extending between first portion 391 and the end of arm 39 located in cage 13. The L7 width of second portion 392 is greater than the L5 width of first portion 391. In fact, although it can be different, the width of second portion 392 is equal to the L6 width of the coiled part 37. Portion 392 is delineated at one of its ends by two recesses 68 and on the other side by two other similar recesses 69 located between first 391 and second 392 portions.

In a particular exemplary embodiment, first portion 391 has a L5 width ranging between 4 and 8 mm. Coiled part 37 has a L6 width of more than 1 mm relative to the L5 width of first portion 391. The metal coil forming the helical spring 36 has a thickness ranging between 0.25 and 0.7 mm. The diameter of coiled part 37 is about 10 mm. Naturally these dimensions could vary depending on the application.

Even if in most cases coiled part 37 is broader than portion 391 of arm 39 passing through opening 43 in order to maximize the power of spring 36, in certain embodiments where severe space constraints are imposed, arm 39 of spring 36 has a portion 391 with a L5 width greater than the L6 width of coiled part 37, as illustrated on FIG. 7c. Such a configuration enables arm 39 to be adapted to the support zone with brush 15 while allowing spring 36 to have a reduced volume. In this case, recesses 68 extend from the part of arm 39 having the same width as coiled part 37 towards the outside of the band of material forming spring 36.

Alternatively, the end of arm 39 of spring 36 only rests against a part of the end face. This part for example could correspond to the base of a groove 75, permitting guidance of arm 39 of spring 36 during its displacement to be facilitated, as illustrated on FIG. 2.

The person skilled in the art could of course modify the configuration of brush holder 10, described above, without leaving the framework of the invention, defined below by the claims.

Thus, alternatively in particular, brush holder 10 comprises more than four brushes 15, it being possible for example that each brush 15 is associated with another brush positioned on the side opposite baseplate 12.

Brush holder 10 here is an electric motor brush holder of a motor vehicle starter. Alternatively, brush holder 10 could also pertain to an alternator or a starter-alternator.

The invention claimed is:

1. A brush cage (13) for a brush holder (10) of an electric motor, the brush cage comprising two lateral walls (26, 27) and a connecting wall (28) connecting the two lateral walls (26, 27),
   at least one of the two lateral walls (26, 27) having an opening (43, 43') for the passage of an arm (39) of a spring (36),
   the opening (43, 43') through the at least one of the two lateral walls (26, 27) having a length (L0) measured between a first end (51) intended to be furthest from a commutator and a second end (52) intended to be closest to the commutator,
   the opening (43, 43') comprising a first portion (431, 431') extending between the first and second ends (51, 52), a second portion (432, 432') extending between the first end (51) and the first portion (431, 431') and a third portion (433) extending between the second end (52) and the first portion (431),
   the first portion (431, 431') widening out towards the second end (52),
   the second portion (432, 432') widening out towards the first end (51),
   the third portion (433) widening out towards the first end (51).

2. The brush cage according to claim 1, wherein the first portion (431, 431') of the first opening (43, 43') comprises first and second edges (44, 45) arranged in the at least one of the two lateral walls (26, 27), and wherein one of the first and second edges (44) is inclined relative to the connecting wall (28) to form the widening.

3. The brush cage according to claim 2, wherein both the first and second edges (44) are inclined relative to the connecting wall (28), and wherein the second edge (45) is inclined in the opposite direction relative to the direction of inclination of the first edge (44).

4. The brush cage according to claim 3, wherein the first portion of the opening further comprises a third edge arranged in the at least one of the two lateral walls (26, 27), and wherein the third edge connects the two edges.

5. The brush cage according to claim 2, wherein the first portion of the opening further comprises a third edge arranged in the at least one of the two lateral walls (26, 27), and wherein the third edge connects the two edges.

6. The brush cage according to claim 1, wherein the first opening (43) comprises a fourth portion (434) extending between the second end (52) and the third portion (433), wherein the fourth portion (434) is delineated by parallel edges of the lateral wall (26, 27) separating two low walls (55, 56) of the at least one of the lateral walls (26, 27), and wherein the brush cage (13) further comprises a fin (57, 59) connecting the two low walls (55, 56).

7. The brush cage according to claim 6, wherein the fin (57) comprises two parts (571, 572) extending in two different planes inclined relative to one another.

8. The brush cage according to claim 1, wherein the first portion (431') of the first opening (43') comprises first, second and third edges (44', 45', 46'), respectively, arranged in the at least one of the two lateral walls (26, 27), and wherein the third edge (46') connects the first edge (44') to the second edge (45'), and wherein the first edge (44') is inclined.

9. A brush cage according to claim 1, wherein the two lateral walls include first and second lateral walls (26, 27), each of the first and second lateral walls (26, 27) having an opening (43, 43'), wherein the first lateral wall (26) comprises the opening (43) defined according to claim 1, and wherein the second lateral wall (27) comprises an opening (43').

10. A brush holder (10) of an electric motor equipped with brush cages (13) according to claim 1.

11. An electric motor comprising a brush holder (10) according to claim 10.

12. A motor vehicle starter comprising an electric motor according to claim 11.

13. The brush cage according to claim 1, wherein the first portion (431') of the opening (43') comprises first, second and third edges (44', 45', 46'), respectively, arranged in the lateral wall (26, 27), and wherein the third edge (46') connects the first edge (44') to the second edge (45'), and wherein the first edge (44') is inclined.

14. The brush cage according to claim 1, wherein the first portion (431, 431') is spaced from the second end (52).

* * * * *